United States Patent Office 3,716,074
Patented Feb. 13, 1973

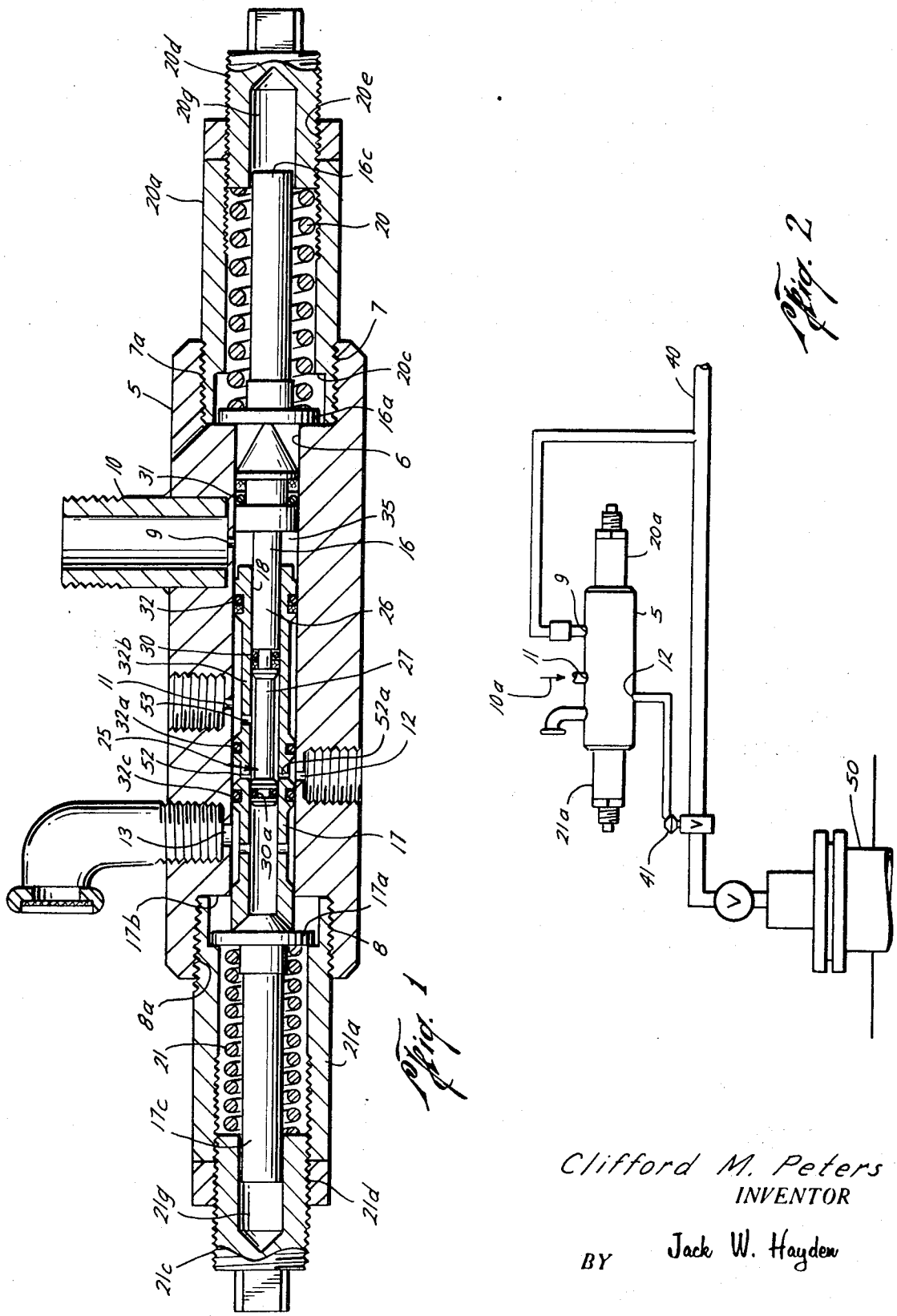

---

3,716,074
COMBINATION HIGH AND LOW PRESSURE CUTOFF CONTROL VALVE
Clifford M. Peters, 16 Rockwall Drive, Longview, Tex. 75601
Filed Sept. 7, 1971, Ser. No. 178,062
Int. Cl. F16k 11/07, 11/10
U.S. Cl. 137—625.6       3 Claims

ABSTRACT OF THE DISCLOSURE

A valve for shutting off a fluid medium in response to pressure variations in a source exceeding a predetermined maximum and falling below a predetermined minimum wherein a longitudinal bore in the body communicates with an opening, inlet, and outlets in the valve body. A pair of valve means is slidably mounted in the longitudinal body bore with one of the pair of valve means being slidably and telescopically received within a bore in the other pair of valve means, and there are seal means for sealing between the valve means and for sealing between the valve means and the bore in the body on each side of the opening to form a chamber within which the pressure from the source is received to act on the pair of valve means to maintain them in a predetermined telescoped relation when the pressure in the source is between the predetermined maximum and minimum.

The valve means are provided with suitable passages and cooperating seal means so that when they are in the predetermined telescoped relation, the fluid medium passes through the valve from the inlet to one of the outlets. The valve means are provided with additional seal means and ports, or passages, so that when the pressure in the flow conduit either exceeds the predetermined maximum or falls below the predetermined minimum, the valve means move to a different telescoped relation so that the fluid pressure medium, instead of being discharged from the inlet to the outlet, is shut off in the valve body, and the outlet which was receiving the fluid pressure medium is connected to discharge to atmosphere through another outlet in the valve body. Adjustable means are provided for urging the pair of valve means to predetermined telescoped relation and for varying the predetermined relation.

BACKGROUND OF THE INVENTION

(1) Field of the invention

The present invention relates to pilot valves which function to open and close off the supply of fluid pressure to another source in response to variations from predetermined conditions in a system, flow line, and the like.

(2) Description of the prior art

Various pilot valves have been proposed and are in use at the present time. Most of such arrangements employ numerous moving parts as well as somewhat complicated structures and flow passages or connections for accomplishing the purpose intended. The prior art of which applicant is aware includes: U.S. Pat. Nos. 1,177,864; 1,303,801; 1,574,234; 2,198,049; 2,216,973; 2,700,981; 2,731,032; 3,018,791; 3,026,904; 3,042,057; 3,043,331; 3,083,726; 3,092,136; and 3,549,208 and German Pat. No. 92,927.

SUMMARY OF THE INVENTION

The present invention relates to a combination high pressure and low pressure pilot valve which is relatively simple in construction and contains a minimum of moving parts as well as a relatively uncomplicated pressure flow arrangement to accomplish its intended function.

An object of the present invention is to provide a compact, yet efficient, pilot valve for controlling the flow of fluid pressure to another valve in a system and to shut off the flow of fluid pressure in response to predetermined ranges of pressure variations within the system or a flow conduit connected with the system.

Yet a further object of the present invention is to provide a combination high and low pressure pilot valve which includes a main valve body with a longitudinal bore extending therethrough. A pair of valve members is arranged in telescoping relation in the longitudinal bore, there being an opening for communicating pressure from a flow line or system which controls the pilot valve to act on said valve means. An inlet and a pair of outlets are provided in the valve body and when the control pressure acting on the valve means exceeds a predetermined maximum or falls below a predetermined minimum, the telescoped relation of the valve means changes so that the inlet is shut off and one outlet communicates with another outlet to vent the fluid medium from the valve.

Other objects and advantages of the present invention will become apparent from the following description and drawings.

BRIEF DESCRIPTION OF THE DRAWINGS

FIG. 1 is a sectional view of the preferred embodiment of the invention; and

FIG. 2 is the schematic representation illustrating the present invention in use in connection with controlling the flow in a conduit.

DESCRIPTION OF THE PREFERRED EMBODIMENT

In FIG. 1 of the drawings, the valve of the present invention is shown as including a valve body 5 which is provided with a longitudinal bore 6 shown as extending substantially centrally thereof.

Counterbores 7 and 8 are provided at each end of the bore 6 in the body 5 for a purpose as will be described hereinafter.

The body 5 also includes opening 9 in which suitable means such as the conduit 10 may be positioned as well as the inlet 11 for receiving a fluid pressure, as will be described, an outlet 12 for discharge of the fluid pressure, and an outlet 13 which is a bleed outlet for bleeding off pressure from the outlet 12 as will be described. The openings 9, 11, 12, and 13 all communicate with the bore 6 extending longitudinally of the body 5. Suitable conduits may be connected to communicate with the inlet and outlets.

A pair of valve means is slidably mounted in the longitudinal body bore 6, such valve means being represented at 16 and 17. It will be noted that one of the pair of valve means 16 is telescopically received within the bore 18 of the other valve means, and that resilient means 20 and 21 are provided for urging the valve means 16 and 17 towards telescoped relation. The valve means 16 includes the spool-like portion 25 integrally formed thereon and which is positioned within the bore 18 of the other valve means 17. Such spool-like arrangement is formed by the recessed annular portion 27 on annular stem 26 with seal means 30 and 30a being provided on stem 26 adjacent the annular reduced portion 27 for sealably engaging the bore 18 as will be described.

Seal means 31 and 32 on the valve means 16 and 17, respectively, on each side of the opening 9 along with the seal means 30 between valves 16 and 17 on one side of the opening form a chamber 35 within the valve body 5 with which communication is established through the opening 9 in the valve body 5.

The chamber 35 receives pressure from the flow line or conduit 40, schematically represented in FIG. 2 of the drawings, and this pressure from the flow line or source 40 acts on the valve means 16 and 17 to maintain them in a predetermined telescoped relationship when the pressure within the conduit 40 is between a predetermined maximum value and a predetermined minimum value. To assist in maintaining the valves 16 and 17 in this position and to accommodate movement thereof, the spring means 20 and 21 are provided.

When the valve means 16 and 17 are in this predetermined telescoped relation, the fluid pressure medium supplied through the inlet 11 is conducted through the valve body 5 and discharged through the outlet 12 to a suitable motor valve represented at 41 in FIG. 2. The motor valve 41 is of a well-known construction and is designed so that as long as fluid pressure medium is supplied thereto through the pilot valve of the present invention, the conduit 40 or flow line is open for flow therethrough; however, should the pressure in the flow line 40 exceed a predetermined value or fall below a predetermined minimum value, so as to reposition the telescoped relation of the valve means 16 and 17 and shut off the flow of fluid pressure medium to valve means 41, then the valve 41 will automatically move to closed position to shut off flow through the conduit 40.

When the valve means 16 and 17 are in the telescoped position as illustrated in FIG. 1 of the drawings, the seal means 32 and the additional seal means 32a adjacent the ends of the reduced annular portion 32b on valve means 17, span the inlet 11 as shown. In turn, the seal means 30 and the additional seal means 30a on valve 16 span the port 53 in the reduced portion 32b of valve means 17. The seal means 32c along with seal means 32a span the outlet 12 in valve body 5 and port 52a in valve 17 so that the fluid pressure medium from the inlet 11 may be conducted through the port 53 and around the reduced portion 27 of valve means 16 to be discharged through the port means 52a between seals 32a and 32c and the outlet 12.

Should the pressure within the chamber 35 (i.e., line 40) fall below the predetermined desired minimum, valve means 17 will be forced to the right by spring 21. When this occurs, seal means 32c will be positioned to the right of outlet 12 (as viewed in FIG. 1), and thereupon outlet 12 will communicate with outlet 13 so that the fluid pressure between outlet 12 and the valve 41 which was acting on the valve means 41 will be bled to atmosphere and valve 41 will close. When seal 32c moves to the right of outlet 12, communication between inlet 11 and outlet 12 is shut off, and this shuts off the pressure supplied through inlet 11 within valve body 5.

Similarly, when the pressure in chamber 35 (i.e., line 40) exceeds a predetermined maximum, valve means 16 will be urged to the right against the force of spring 20, and this will position the additional seal means 30a to the right of the ports 52 and 52a in valve 17 as viewed in FIG. 1 to shut off communication between inlet 11 and outlet 12 and open communication between outlets 12 and 13.

Thus, it can be seen that the present invention functions when the pressure in the flow line 40 exceeds a predetermined maximum value or falls below a predetermined minimum value to shut off the flow of pressure fluid to valve 41 in conduit 40.

The fluid pressure supplied to inlet 11 from connection 10 is from a suitable source 10a, and is at a sufficient pressure to maintain valve 41 in open position against its spring closing force. Thus, the well represented at 50 may flow through valve 41 and conduit 40 when it is within the predetermined maximum and minimum range. Should something cause the pressure in conduit 40 to exceed the desired maximum or fall below the desired minimum, then the pilot valve functions to permit valve 41 to close and shut off flow through conduit 40.

Valve means 16 includes extension 16c with shoulder means 16a thereon against which one end of the spring 20 rides, such spring being received within the cylindrical member 20a which is threaded at 7a within the counterbore 7. A shoulder 20c is provided for limiting the movement of the shoulder 16a when the valve 16 moves to the right, and the nut 20d threaded in opening 20e of the cylindrical member 20a may be employed to maintain the desired force on spring 20 acting against valve 16 to maintain the valve 16 in the desired predetermined telescoped relationship with respect to valve 17.

The valve means 17 includes extension 17c with annular shoulder 17a thereon against which one end of spring 21 rides. The travel of valve 17 is limited by the shoulder 17b formed at the bottom of counterbore 8 in the body. Spring 21 is retained within the housing 21a which is threadedly received at 8a within the counterbore 8, and a nut 21c is threadedly engaged in the opening 21d for maintaining a desired force against the spring 21 as desired. Extensions 16c and 17c of the valve means 16 and 17, respectively, may be received within the bores 20g and 21g, respectively, of the nuts 20d, 21c, respectively.

The springs 20 and 21 exert sufficient force to maintain valves 16 and 17 in proper telescoping relation when the pressure in chamber 35 (i.e., in conduit 40) is between the predetermined maximum and minimum range; however, the springs accommodate movement of the valves when the predetermined maximum is exceeded in chamber 35 or when the pressure in chamber 35 falls below a predetermined minimum as described herein for the valve of the present invention to function as described.

From the foregoing description, it can be seen that the present invention provides a valve with, in effect, a single main passage and with a minimum of porting and passages in the valve. Such construction is quite efficient, yet employs a minimum number of moving parts and arrangement.

The foregoing disclosure and description of the invention are illustrative and explanatory thereof, and various changes in the size, shape, and materials as well as in the details of the illustrated construction may be made without departing from the spirit of the invention.

What is claimed is:

1. A valve for shutting off a fluid medium in response to pressure variations from a source of fluid pressure exceeding a predetermined maximum and falling below a predetermined minimum comprising:
   (a) a valve body;
   (b) said valve body having an opening for receiving flow from the source;
   (c) said valve body having an inlet for receiving a fluid medium and a pair of outlets for discharging the fluid medium, one of which outlets functions as a bleed for bleeding off the fluid medium from the other outlet in said valve body;
   (d) said body having a longitudinal bore with which the opening, inlet, and outlets in said valve body communicate;
   (e) a pair of valve means slidably mounted in the longitudinal body bore, with one of said pair of valve means being telescopically received within a bore in the other of said pair of valve means;
   (f) resilient means urging said pair of valve means toward telescoping relation within the longitudinal body bore;
   (g) seal means sealing between said one and other valve means on one side of the body opening and seal means on said one and other valve means, respectively, sealing with the longitudinal body bore on each side of the body opening to form a chamber in said valve body within which the pressure from the source is received to act on said pair of valve means and maintain them in a predetermined telescoped relation when the pressure in the source is between the predetermined maximum and minimum; and (h) additional seal means and port means on said other valve means cooperating with additional seal means on said one valve means for conducting the fluid medium from the body inlet to the other body outlet when said one and other valve means are maintained in the predetermined telescoped relation by the pressure in the body chamber, and said one and other valve means changing from the predetermined telescoped relation when the pressure in the chamber exceeds the predetermined maximum or falls below the predetermined minimum in the source so that the outlets in said valve body are communicated with each other.

2. The invention of claim 1 wherein said resilient means comprises spring means carried by said valve body and means carried by said valve body for adjusting and maintaining the force exerted by said spring means on said one and other valve means.

3. The invention of claim 1 including shoulder means on the valve to limit the movement of said resilient means.

References Cited

UNITED STATES PATENTS

| | | | |
|---|---|---|---|
| 2,641,279 | 6/1953 | Baldwin | 137—625.6 |
| 2,763,279 | 9/1956 | Godden et al. | 137—487 X |
| 3,463,558 | 8/1969 | Nichols | 137—625.6 X |

HENRY T. KLINKSIEK, Primary Examiner

U.S. Cl. X.R.

137—487